United States Patent [19]

Laman

[11] Patent Number: 5,418,429

[45] Date of Patent: May 23, 1995

[54] HUMIDITY RESPONSIBLE MOTOR VEHICLE RUNNING LAMPS CONTROL CIRCUIT

[76] Inventor: Michael H. T. Laman, 116 Cyril Ave., Prospect Park, N.J. 07508

[21] Appl. No.: 241,704

[22] Filed: May 12, 1994

[51] Int. Cl.⁶ .............................................. B60Q 1/02
[52] U.S. Cl. ..................................... 315/82; 315/156; 307/10.8
[58] Field of Search .................... 315/82, 156, 159, 77, 315/83, 80, 155; 307/10.8, 118, 10.1, 9.1; 362/80.1, 80, 83.3; 361/175

[56] References Cited

U.S. PATENT DOCUMENTS

| | | | |
|---|---|---|---|
| 4,306,158 | 12/1981 | Ogle | 315/82 X |
| 4,667,129 | 5/1987 | Papillon | 315/82 |
| 5,185,558 | 2/1993 | Benedict et al. | 315/80 |
| 5,349,267 | 9/1994 | Brassier et al. | 315/82 |

Primary Examiner—Ali Neyzari
Attorney, Agent, or Firm—Alfred C. Hill

[57] ABSTRACT

An automatic control circuit for predetermined running lamps of a motor vehicle having an engine and a voltage source supplying a predetermined voltage comprising a first device to monitor performance of the engine; and a second device to detect humidity in air adjacent to the vehicle; the first device and the second device being coupled to each other in a given sequential order and between the voltage source and the predetermined running lamps to couple the predetermined voltage to the predetermined running lamps to turn ON the predetermined running lamps when the engine is running and the humidity exceeds a given humidity value and to turn OFF the predetermined running lamps when the engine is running and the humidity is below the given humidity value.

20 Claims, 1 Drawing Sheet

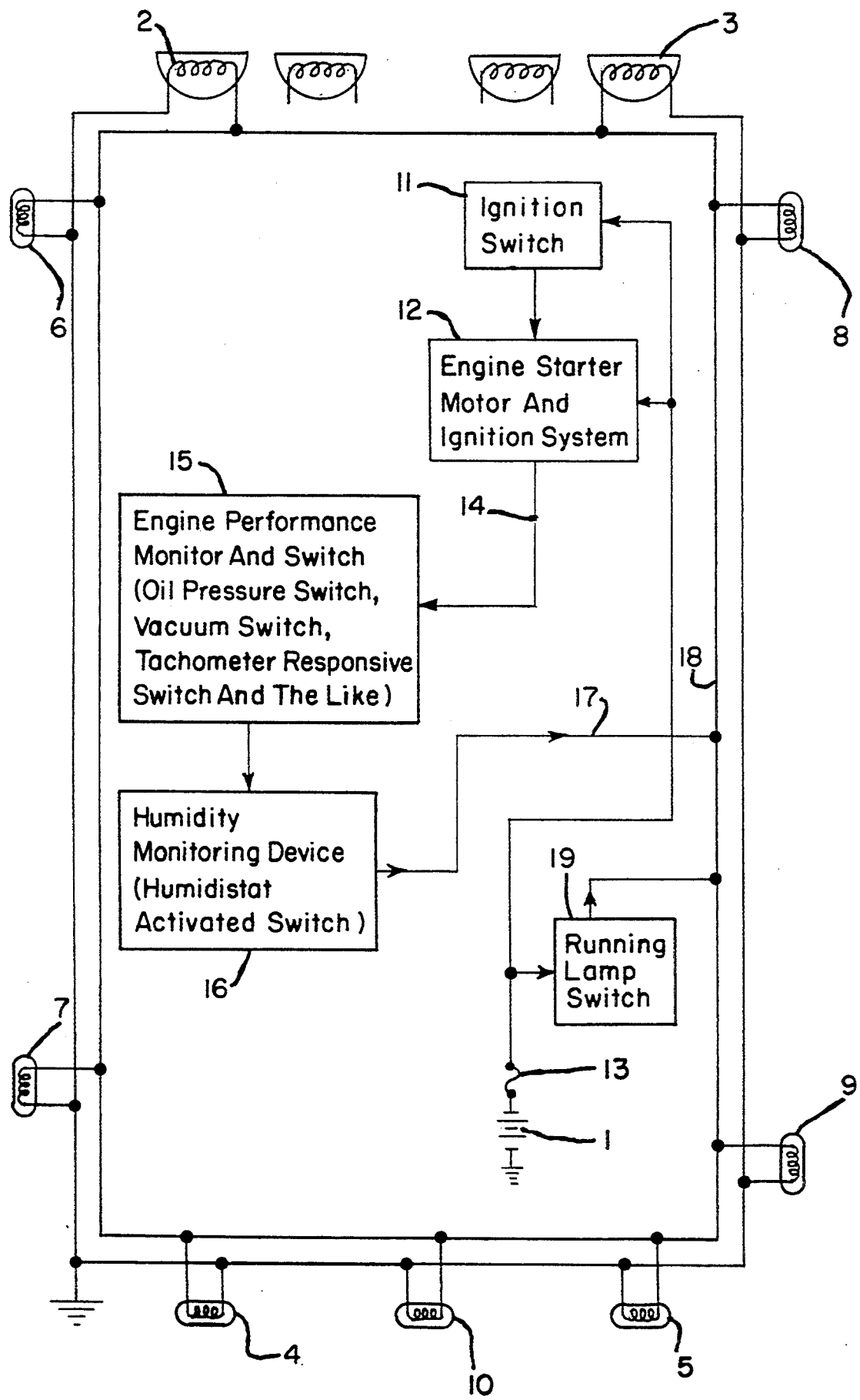

HUMIDITY RESPONSIBLE MOTOR VEHICLE RUNNING LAMPS CONTROL CIRCUIT

BACKGROUND OF THE INVENTION

The present invention relates to motor vehicle running lamps control circuits and more particularly to a humidity responsive motor vehicle running lamps control circuit.

Because of the accidents and fatalities occurring on roadways and highways, the total number of productive man-hours lost has been growing larger and larger each year at an alarming rate. As a result, much emphasis is being placed on highway safety. This is most evident in the increasing amount of safety regulation being enacted in several states which require various types of safety equipment to be installed on all motor vehicles as standard equipment.

Most recently, legislation is being directed to the use of windshield wipers and lights during conditions of rain, snow or fog. When rain, snow or fog are present, the condition is usually accompanied by a reduction in the amount of available light. As a result, it frequently becomes necessary for motorists to turn on their headlights to increase their visible range and to be visible to other motorists. Since in many instances, there is some amount of light available, motorists frequently resort only to the use of parking lamps in the mistaken belief that they can see effectively ahead to avoid accidents and that other motorists approaching them can see them. While the energization of the parking lamps, which also light the rear or tail lamps of the motor vehicle, give notice to nearby motor vehicles approaching from the rear or front, the parking lamps are insufficient in times of heavy rain, snow or fog.

Several states have recognized a need for additional lighting during such bad weather conditions and the fact that many motorists do not turn on their head lamps under such conditions, have enacted legislation which requires a motorist, when he or she has need of windshield wipers during conditions of rain, snow or fog, to have their head lamps in operation. Unfortunately, motor vehicles are presently designed with separate controls for the head lamps and other running lamps and the windshield wiper. As a result, many motorists through habit, forgetfulness or neglect, fail to operate their head lamps (running lamps) in rainy, snowing or foggy weather, even though the use of head lamps would be desirable as a safety measure or may be required by law.

In addition, several safety councils both in the U.S.A. and foreign countries, bus lines, trucking firms and other companies have recommended or mandated that the head lamps be used in all weather, in other words, that the head lamps be turned on when the engine is turned on. It is the premise of these organizations that like motorcycles the use of head lamps in other motor vehicles would increase the visibility of oncoming motor vehicles and also the visibility of motor vehicles being overtaken by other motor vehicles, since when the head lamps go on normally the tail lamps also go on.

The prior art, such as U.S. Pat. Nos. 3,500,119; 3,500,120; 3,591,845; 4,656,363; 5,205,634; 5,231,331 and 5,235,250, is directed solely to the premise that head lamps be automatically turned ON when the windshield wipers of the motor vehicles are turned ON.

The prior art, such as U.S. Pat. Nos. 3,171,058; 3,706,006; 3,774,071; 3,829,828; 3,963,940; 3,993,914; 4,306,158 and 4,667,129, is directed solely to the premise that the head lamps be automatically turned ON when the engine of the motor Vehicle is running.

The prior arts, such as U.S. Pat. Nos. 5,027,001; 5,136,209 and 5,185,558, is directed solely to the premise that the head lamps be automatically turned ON when moisture (water only) due to inclement weather conditions, such as rain, snow and the like, hits the windshield of the motor vehicle.

There does not appear to be any prior art directed to the premise that the head lamps and other running lamps be turned ON as soon as humidity in the air adjacent to the motor vehicle exceeds a predetermined value with this predetermined value being determined by the rain, snow or fog that the motor vehicle may encounter in the environmental climate through which the motor vehicle is operated.

When the humidity in the air adjacent or surrounding the motor vehicle is a certain value and the engine of the motor vehicle is running the head lamps will be turned ON and when this humidity of the adjacent air is less than the given value and the engine is running the running lamps will be turned OFF which occurs when the motor vehicle travels out of the inclement weather.

SUMMARY OF THE INVENTION

An object of the present invention is to provide an automatic control circuit for predetermined running lamps of a motor vehicle responsive to the humidity in the air adjacent the motor vehicle occurring during inclement weather.

A feature of the present invention is the provision of an automatic control circuit for predetermined running lamps of a motor vehicle having an engine and a voltage source supplying a predetermined voltage comprising first means to monitor performance of the engine; and second means to detect humidity in air adjacent to the vehicle; the first means and the second means being coupled to each other in a given sequential order and between the voltage source and the predetermined running lamps to couple the predetermined voltage to the predetermined running lamps to turn ON the predetermined running lamps when the engine is running and the humidity exceeds a given humidity value and to turn OFF the predetermined running lamps when the engine is running and the humidity is below the given humidity value.

Another feature of the present invention is the provision of an automatic control circuit for predetermined running lamps of a motor vehicle having an engine and a voltage source supplying a predetermined voltage comprising a starter motor, an ignition switch and ignition system for the engine coupled to the voltage source to start the engine, to maintain the engine in a running condition and to provide the predetermined voltage at an output thereof; first means to monitor performance of the engine; and second means to detect humidity in the air surrounding the vehicle; the first means and the second means being coupled to each other in a given sequential order and between the predetermined running lamps and the output of the starter motor, ignition switch and ignition system to couple the predetermined voltage to the predetermined running lamps to turn ON the predetermined running lamps when the engine is running and the humidity exceeds a given humidity value and turns OFF the predetermined running lamps when the engine is running and the humidity is below the given humidity value.

A further feature of the present invention is the provision of an automatic control circuit for predetermined running lamps of a motor vehicle having an engine and a voltage source supplying a predetermined voltage comprising a humidistat activated switch coupled between the voltage source and the predetermined running lamps to couple the predetermined voltage to the predetermined running lamps to turn ON the predetermined running lamps when humidity in the air adjacent the vehicle exceeds a given value and the engine is running and to disconnect the predetermined voltage from the running lamps to turn OFF the predetermined running lamps when the humidity is below the given value and the engine is running.

BRIEF DESCRIPTION OF THE DRAWING

Above-mentioned and other features and objects of the present invention will become more apparent by reference to the following description taken in conjunction with the accompanying drawing, in which the sole FIGURE is a block diagram of the automatic control circuit for predetermined running lamps of a motor vehicle in accordance with the principles of the present invention.

DESCRIPTION OF THE PREFERRED EMBODIMENTS

Referring to the FIGURE, the automatic control circuit of the present invention is illustrated as being incorporated in the electric circuit of a motor vehicle in a cooperative relationship with the usual battery 1 and predetermined running lamps, primarily head lamps 2 and 3 and tail lamps 4 and 5. The head lamp arrangement illustrated in the FIGURE is that arrangement having separate bulbs or envelopes for a low beam condition and a high beam condition of the head lamps. If the head lamp arrangement includes a single envelope or bulb having a high beam filament and a low beam filament in each head lamp, the automatic control circuit of the present invention is disposed in the low beam circuit. For safety purposes, it is these four lamps, head lamps 2 and 3 and tail lamps 4 and 5 that must be turned ON to make other vehicles on the roadway aware of the subject vehicle. It is also possible for the automatic control circuit of the present invention to automatically control marker lamps 6, 7, 8, and 9 and license plate lamp 10 along with head lamps 2 and 3 and tail lamps 4 and 5.

In accordance with the principles of the present invention, the control circuit for the predetermined running lamps includes an ignition switch 11 and an engine starter motor and ignition system 12 coupled to battery 1 through a fuse 13. Ignition switch 11 and the engine starter motor and ignition system 12 starts the engine and maintains the engine in the running condition and also provides at the output 14 the voltage of battery 1. The voltage output 14 is coupled to an engine performance monitor and switch 15 which when the switch is closed will couple the voltage of battery 1 to the humidity monitoring device 16 which monitors the humidity in air surrounding or adjacent to the motor vehicle. When the humidity surrounding or adjacent to the motor vehicle exceeds a given value the predetermined voltage from battery 1 at the output of engine performance monitor and switch 15 is coupled to the running lamps along conductors 17 and 18. When the humidity is below this given value no output of the predetermined voltage of battery 1 is coupled to conductors 17 and 18 and thereby will maintain the running lamps OFF, or will turn the running lamps OFF if they had been turned ON by humidity greater than the given value.

The engine performance monitor and switch 15 may be an oil pressure switch which is responsive to a given pressure value to indicate when the engine is running, it may be a vacuum switch that closes when the vacuum of the engine exceeds a given vacuum value again indicating the engine is running, or it may be a tachometer responsive switch that closes when the engine exceeds a given value of revolutions per minute indicating the engine is running.

The humidity monitoring device 16 may be a humidistat activated switch that remains open as long as the humidity surrounding or adjacent the motor vehicle is below the given value but will be closed when the humidity surrounding or adjacent the motor vehicle exceeds the given value.

Thus, the control system in accordance with the principles of the present invention employs a humidistat actuated switch that responds to the humidity in the air surrounding or adjacent to the motor vehicle and will provide the battery voltage to conductors 17 and 18 when the given value of the humidity is exceeded and the engine is running as determined by the engine performance monitor and switch 15. When the humidity adjacent the vehicle falls below the given value, as would be the case when the vehicle travels out of the inclement weather, the humidistat switch would turn OFF the running lamps.

As recognized from the FIGURE the engine performance monitor and switch 17 and the humidity monitoring device 16 are in the sequential order of the engine performance monitor and switch 17 being coupled to the ignition system 12 before the humidity monitoring device 16 this, being a predetermined or given sequential order. This order can be reversed, however, where the humidity monitoring device 16 will be connected to the output 14 of engine starter motor and ignition system 12 with the engine performance monitor and switch following the humidity monitoring device 16 in a second given sequential order.

The predetermined voltage at the output of battery 1 may be 6 or 12 volts where a normal 6 or 12 volt battery is used for battery 1, or a higher value if a bus, large truck or a tractor-trailer is involved.

Therefore, the predetermined running lamps will be turned ON during inclement weather or times of poor visibility by reason of the humidity present in rain, snow or fog above the given value of humidity determined by the adjustment on the humidistat activated switch of humidity monitoring device 16. The given humidity level of the humidity monitoring device 16 can be adjusted to accommodate different climate conditions in different sections of the operating area of the motor vehicle.

The customary pull knob or other type of running lamp switch 19 is connected between battery 1 and the predetermined running lamps as is customary in all motor vehicles so that the predetermined running lamps can be turned ON or OFF manually when the engine is not running and if the automatic control circuit of the present invention should fail. Switch 19 could also include a photocell to detect low light level, such as dusk, and automatically turn the running lamps ON. Thus, switch 19 effectively bypasses the automatic control circuit of the present invention. Also, all light warning buzzers and other light switches including the high beam of the head lamps and the four way emergency flasher circuits are all capable of being activated as is customary.

While I have described above the principles of my invention in connection with specific apparatus, it is to be clearly understood that this description is made only by way of example and not as a limitation to the scope of my invention as set forth in the objects thereof and in the accompanying claims.

I claim:

1. An automatic control circuit for predetermined running lamps including at least headlamps and tail lamps of a motor vehicle having an engine and a voltage source supplying a predetermined voltage comprising:
   first means to monitor performance of said engine; and
   second means to detect only humidity in air adjacent to said vehicle;
   said first means and said second means being coupled to each other in a given sequential order and between said voltage source and said predetermined running lamps to couple said predetermined voltage to said predetermined running lamps to turn ON said predetermined running lamps when said engine is running and said humidity exceeds a given humidity value and to turn OFF said predetermined running lamps when said engine is running and said humidity is below said given humidity value.

2. A control circuit according to claim 1, wherein said first means includes
   an oil pressure switch that closes when oil pressure of said engine exceeds a given pressure value indicating that said engine is running.

3. A control circuit according to claim 2, wherein said second means includes
   a humidistat activated switch that closes when said humidity exceeds said given humidity value and opens when said humidity is below said given humidity value.

4. A control circuit according to claim 3, wherein said humidistat activated switch is adjustable to accommodate different climate conditions.

5. A control circuit according to claim 1, wherein said first means includes
   a vacuum switch that closes when vacuum of said engine exceeds a given vacuum value indicating that said engine is running.

6. A control circuit according to claim 5, wherein said second means includes
   a humidistat activated switch that closes when said humidity exceeds said given humidity value and opens when said humidity is below said given humidity value.

7. A control circuit according to claim 6, wherein said humidistat activated switch is adjustable to accommodate different climate conditions.

8. A control circuit according to claim 1, wherein said first means includes
   a tachometer responsive switch that closes when said engine exceeds a given value of revolutions per minute indicating that said engine is running.

9. A control circuit according to claim 8, wherein said second means includes
   a humidistat activated switch that closes when said humidity exceeds said given humidity value and opens when said humidity is below said given humidity value.

10. A control circuit according to claim 9, wherein said humidistat activated switch is adjustable to accommodate different climate conditions.

11. A control circuit according to claim 1, wherein said second means includes
    a humidistat activated switch that closes when said humidity exceeds said given humidity value and opens when said humidity is below said given humidity value.

12. A control circuit according to claim 11, wherein said humidistat activated switch is adjustable to accommodate different climate conditions.

13. An automatic control circuit for predetermined running lamps including at least headlamps and tail lamps of a motor vehicle having an engine and a voltage source supplying a predetermined voltage comprising:
    a starter motor, ignition switch and ignition system for said engine coupled to said voltage source to start said engine, to maintain said engine in a running condition and to provide said predetermined voltage at an output thereof;
    first means to monitor performance of said engine; and
    second means to detect only humidity in air surrounding said vehicle;
    said first means and said second means being coupled to each other in a given sequential order and between said predetermined running lamps and said output of said starter motor, ignition switch and ignition system to couple said predetermined voltage to said predetermined running lamps to turn ON said predetermined running lamps when said engine is running and said humidity exceeds a given humidity value and turns OFF said predetermined running lamps when said engine is running and said humidity is below said given humidity value.

14. A control circuit according to claim 13, wherein said second means includes
    a humidistat activated switch that closes when said humidity exceeds said given humidity value and opens when said humidity is below said given humidity value.

15. A control circuit according to claim 14, wherein said humidistat activated switch is adjustable to accommodate different climate conditions.

16. A control circuit according to claim 13, wherein said first means includes
    an oil pressure switch that closes when oil pressure of said engine exceeds a given pressure value indicating that said engine is running; and
    said second means includes
    a climate adjustable humidistat actuated switch that closes when said humidity exceeds said given humidity value.

17. A control circuit according to claim 13, wherein said first means includes
    a vacuum switch that closes when vacuum of said engine exceeds a given vacuum value indicating that said engine is running; and
    said second means includes
    a climate adjustable humidistat actuated switch that closes when said humidity exceeds said given humidity value.

18. A control circuit according to claim 13, wherein said first means includes
  a tachometer responsive switch that closes when said engine exceeds a given value of revolutions per minute indicating said engine is running; and
said second means includes
  a climate adjustable humidistat actuated switch that closes when said humidity exceeds said given humidity value.

19. An automatic control circuit for predetermined running lamps including at least headlamps and tail lamps of a motor vehicle having an engine and a voltage source supplying a predetermined voltage comprising:

a humidistat activated switch coupled between said voltage source and said predetermined running lamps to couple said predetermined voltage to said predetermined running lamps to turn ON said predetermined running lamps when only humidity in air adjacent said vehicle exceeds a given value and said engine is running and to disconnect said predetermined voltage from said running lamps to turn OFF said predetermined running lamps when said humidity is below said given value and said engine is running.

20. A control circuit according to claim 19, wherein said humidistat activated switch is adjustable to accommodate different climate conditions.

* * * * *